United States Patent
Schelling (12)

(10) Patent No.: US 7,350,063 B2
(45) Date of Patent: Mar. 25, 2008

(54) SYSTEM AND METHOD TO FILTER PROCESSORS BY HEALTH DURING EARLY FIRMWARE FOR SPLIT RECOVERY ARCHITECTURE

(75) Inventor: Todd A. Schelling, Irmo, SC (US)

(73) Assignee: Intel Corporation, Santa Clara, CA (US)

( * ) Notice: Subject to any disclaimer, the term of this patent is extended or adjusted under 35 U.S.C. 154(b) by 705 days.

(21) Appl. No.: 10/171,210

(22) Filed: Jun. 11, 2002

(65) Prior Publication Data

US 2003/0229775 A1 Dec. 11, 2003

(51) Int. Cl.
*G06F 15/177* (2006.01)
*G06F 11/00* (2006.01)

(52) U.S. Cl. .................. 713/1; 713/2; 714/23

(58) Field of Classification Search .............. 713/2, 713/1; 717/170; 709/715; 714/25, 48, 23
See application file for complete search history.

(56) References Cited

U.S. PATENT DOCUMENTS

| | | | | |
|---|---|---|---|---|
| 5,524,209 A * | 6/1996 | Parker et al. | ............... | 714/36 |
| 5,724,527 A * | 3/1998 | Karnik et al. | ............... | 710/315 |
| 5,764,882 A * | 6/1998 | Shingo | ............... | 714/11 |
| 5,790,850 A | 8/1998 | Natu | | |
| 5,904,733 A * | 5/1999 | Jayakumar | ............... | 713/2 |
| 5,918,047 A | 6/1999 | Leavitt et al. | | |
| 6,058,475 A * | 5/2000 | McDonald et al. | ............... | 713/2 |
| 6,381,693 B2 * | 4/2002 | Fish et al. | ............... | 713/1 |
| 6,549,961 B1 * | 4/2003 | Kloth | ............... | 710/36 |
| 6,564,348 B1 * | 5/2003 | Barenys et al. | ............... | 714/732 |
| 6,601,165 B2 * | 7/2003 | Morrison et al. | ............... | 713/2 |
| 6,842,857 B2 * | 1/2005 | Lee et al. | ............... | 713/2 |
| 6,889,341 B2 * | 5/2005 | Collins et al. | ............... | 714/23 |

2002/0152371 A1 10/2002 Lee et al.

FOREIGN PATENT DOCUMENTS

| | | |
|---|---|---|
| EP | 0 747 819 A1 | 12/1996 |
| GB | 2 351 820 A | 1/2001 |

OTHER PUBLICATIONS

Tanenbaum, Structured Computer Organization, 1984, Prentice-Hall, Second Edition, pp. 10-12.*
Intel Corporation, "Processor Abstraction Layer" Intel®, Itanium™ Architecture Software Developer's Manual; vol. 2: System Architecture, Revision 2.0 pp. 253-284, Dec. 2001.
Intel Corporation, "Interruptions and Serialization" Intel®, Itanium™ Architecture Software Developer's Manual; vol. 2: System Architecture, Revision 2.0 pp. 405-414, Dec. 2001.
Intel Corporation, "External Interrupt Architecture" Intel®, Itanium™ Architecture Software Developer's Manual; vol. 2: System Architecture, Revision 2.0 pp. 463-472, Dec. 2001.
IPEA/US, Written Opinion for International Application No. PCT/US03/14877, 6 pages, Apr. 14, 2005.

* cited by examiner

*Primary Examiner*—Suresh K Suryawanshi
(74) *Attorney, Agent, or Firm*—Blakely, Sokoloff, Taylor & Zafman LLP (57) ABSTRACT

A system and method to determine a healthy group of processors and associated firmware for booting a system after a resetting event is disclosed. Redundant copies of processor specific firmware are examined for validity. Processors determine their own health status, and one processor determines a group of processors with the best available health status. Inter-processor interrupt messages provide the communication mechanism to allow an algorithm to determine a group of processors to continue booting the system.

46 Claims, 5 Drawing Sheets

FIG. 1

BIOS FLASH MEMORY

| |
|---|
| PRIMARY FIT POINTER 210 |
| SECONDARY FIT POINTER 212 |
| |
| PAL-A GENERIC 220 |
| SAL-A GENERIC 222 |
| |
| PRIMARY FIT 224 |
| PRIMARY PAL-A SPECIFIC TYPE 1 230 |
| PRIMARY PAL-A SPECIFIC TYPE 2 232 |
| PRIMARY SAL-A SPECIFIC 246 |
| |
| SECONDARY FIT 234 |
| SECONDARY PAL-A SPECIFIC TYPE 1 240 |
| SECONDARY PAL-A SPECIFIC TYPE 2 242 |
| SECONDARY SAL-A SPECIFIC 260 |
| |
| PAL-B TYPE 1 250 |
| PAL-B TYPE 2 252 |
| |
| SAL-B 262 |
| |

SYSTEM AND METHOD TO FILTER PROCESSORS BY HEALTH DURING EARLY FIRMWARE FOR SPLIT RECOVERY ARCHITECTURE

FIELD

The present disclosure relates generally to microprocessor systems, and more specifically to microprocessor systems capable of multiple processor operation with field upgradeable firmware.

BACKGROUND

Processors within a microprocessor system may depend upon firmware to perform self tests and initiate operations subsequent to a resetting event. In a multiple processor system, even processors within the same general family of processors may differ from each other due to processor speed, stepping level, certain architectural revisions, and many other parameters. For this reason, firmware may include several modules that are each specific to one group of processors within a general family of processors.

Additionally, there may be reasons to perform field upgrades to such firmware modules. Flash memory or other field upgradeable memories may initially contain the initial firmware modules, and these modules may be overwritten with updated firmware modules at a later date. However, since the flash memory may be written to, it may possibly become corrupted. The very firmware that controls updating the firmware may itself become corrupted, preventing field recovery of the system. In this case the system may need to be returned to the manufacturer to have the flash memory physically replaced with a new flash memory module containing uncorrupted firmware.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for selecting and initializing processors in a multiple processor system. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of hardware within a microprocessor system. However, the invention may be practiced in other forms of processor such as a digital signal processor, a minicomputer, or a mainframe computer. Similarly, the invention is disclosed using inter-processor interrupts as a method for signaling between processors. However, the invention may be practiced using other forms of signaling.

In one embodiment, the selection and initialization of healthy processors in a multiprocessor is begun by each processor examining firmware modules required for its own operation. Each processor then determines its own processor health status. Then a deterministic method selects a temporary master processor that collects all the health statuses of the processors, and determines a group of processors all of which have the highest available processor health status. The temporary master processor then enables processors that are members of this group to continue with booting operations, and halts execution or otherwise disables processors (including itself when necessary) that are not members of this group.

Figure 1:
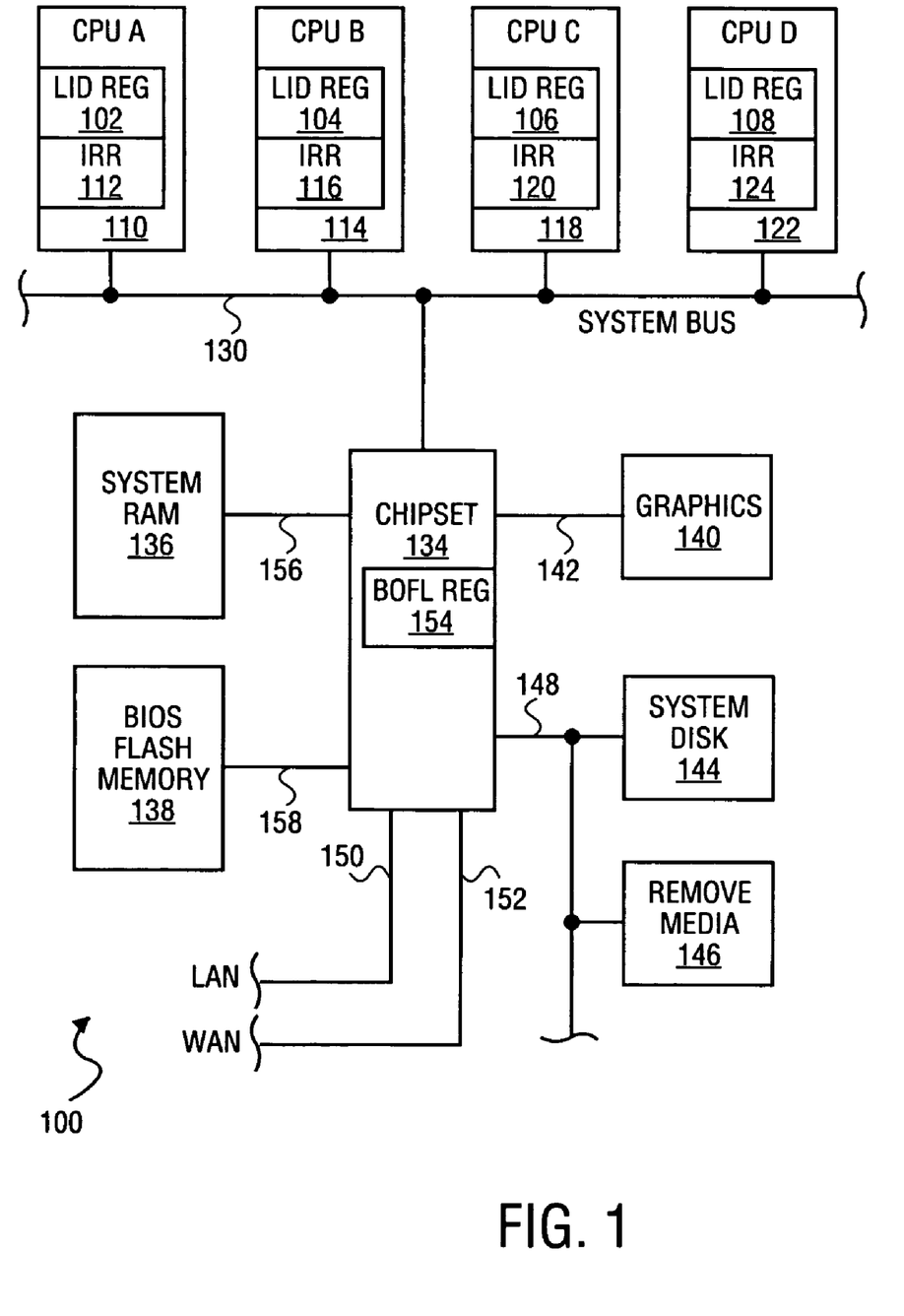
FIG. 1 is a schematic diagram of system hardware components, according to one embodiment.

Referring now to FIG. 1, a schematic diagram of system hardware components is shown, according to one embodiment. Several processors are shown, central processing units CPU A 110, CPU B 114, CPU C 118, and CPU D 122. In other embodiments, there may only be one processor, or there may be a pair of processors, or more than four processors. In one embodiment, the processors may be compatible with the Intel® Itanium™ processor family. Processors such as CPU A 110, CPU B 114, CPU C 118, and CPU D 122 may include one or more interrupt request registers (IRR), such as the shown IRR 112, 116, 120, and 124, respectively. A typical interrupt sent to a processor, such as CPU A 110, may write a value to IRR 112 that may include a vector that generally describes a memory location needed for servicing the interrupt. CPU A 110 may enable or disable interrupt servicing. When interrupt servicing is disabled, the IRR 112 may still receive the vector but CPU A 110 may not automatically service the interrupt. However, CPU A 110 may still read the vector contained within IRR 112. Operating in this manner with interrupt servicing disabled is often referred to as "polled mode." In addition, each processor contains a unique ID referred to as a LID. The LID serves as a unique address of the processor on the system bus. Interrupts may be directed specifically to a processor with a known LID. The LID value may be stored in a LID register, such as LID registers 102, 104, 106, and 108 of CPU A 110, CPU B 114, CPU C 118, and CPU D 122, respectively. In other embodiments, the LID values may be stored in other circuit elements than registers.

The processors CPU A 110, CPU B 114, CPU C 118, and CPU D 122 may be connected via a system bus 130 with each other and with chipset 134. The connection via the system bus 130 and the chipset 134 permits the processors to access system random access memory (RAM) 136, basic input output system (BIOS) flash memory 138, and various input/output (I/O) devices, such as a controller for graphics 140 and various program storage devices. Such program storage devices may include a system fixed disk 144 and a drive for removable media 146. In various embodiments, drive for removable media 146 may be magnetic tape, removable magnetic disks, diskettes, electro-optical disks, or optical disks such as compact disk—read only memory (CD-ROM) or digital versatile disk—read only memory (DVD-ROM). The I/O devices may be connected to the chipset 134 via a dedicated interface, such as advanced graphics port (AGP) 142, or via general-purpose interfaces such as peripheral component interconnect (PCI) bus (not shown), universal serial bus (USB) (not shown), or integrated drive electronics (IDE) bus 148. Additional I/O devices may include connectivity to a local area network (LAN) 150 or a wide area network (WAN) 152. In other embodiments, many other interfaces may be used.

A computer system 100 may include a hardware semaphore register someplace within its architecture. A hardware semaphore register may be defined as a register that returns one value on the first read after a resetting event, and another value on subsequent reads after the first read. In one embodiment, chipset 134 may include one specific example of a hardware semaphore register, a Boot Flag (BOFL) register 154. The BOFL register 154 may be used during system initialization to determine which processor among CPU A 110, CPU B 114, CPU C 118, and CPU D 122 may act as a temporary master processor. In one embodiment, BOFL register 154 may return one value on the first read after a resetting event, and another value on subsequent reads. In another embodiment, each time a processor reads BOFL register 154 after a resetting event, a different number is given in a predetermined sequence. The first processor to read the BOFL register 154 receives a value of zero. Subsequent reads of the BOFL register 154 return a non-zero value. The master processor is the processor that successfully read a value of zero from the BOFL.

In one embodiment, an operating system may be installed on system fixed disk 144 and the kernel of the operating system may be loaded into system RAM 136. In other embodiments, the operating system may be loaded or execute over the LAN 150 or WAN 152.

Figure 2:
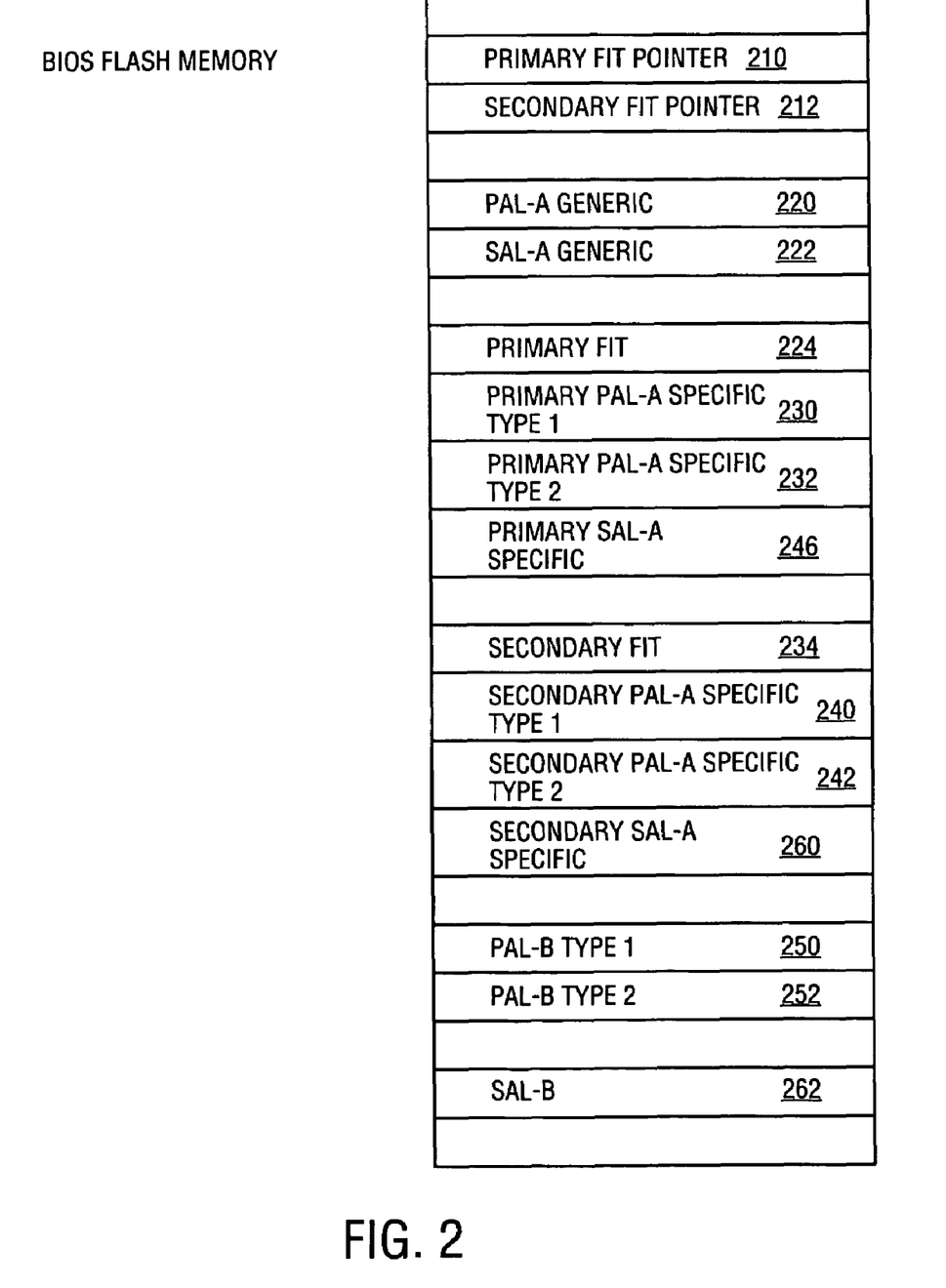
FIG. 2 is a diagram showing software components in a memory, according to one embodiment.

Referring now to FIG. 2, a diagram showing software components in a memory is shown, according to one embodiment. In one embodiment, the BIOS components are shown residing within a BIOS flash memory 138 of FIG. 1, but in other embodiments the BIOS could reside within other forms of non-volatile memory or also in other forms of volatile memory. When software components reside within non-volatile memory, they may be referred to as firmware.

The BIOS may include modules that are generally processor related, such as processor abstraction layer (PAL) firmware, or generally non-processor system related, such as system abstraction layer (SAL). Differing processors may require different revisions or types of PAL firmware, due in part to differences in processor revisions. It may be advantageous to update the versions of the PAL or SAL firmware within a system and modify the flash memory to accommodate the updated versions.

However, serious problems may arise upon attempting to update the BIOS in flash memory. If, as in one simple example, the power is interrupted during the updating, the flash memory may contain corrupted copies of BIOS, including that portion of the BIOS that controls the writing to flash memory. Once this occurs, there may be no repair other than to solder in a new flash memory containing the correct code. To reduce the frequency of occurrence of such problems, in one embodiment the PAL code and SAL code may be divided. The PAL code may be divided into that portion of PAL minimally required for system initialization, called PAL-A, and the remaining code that in one embodiment may be called PAL-B. Furthermore, PAL-A may in turn be subdivided into a basic PAL-A that is processor independent (PAL-A generic) and PAL-A code that is specific to a given processor revision (PAL-A specific). Since the PAL-A generic is processor independent, it need not be updated and therefore may reside in an area of flash memory where updating is disabled. Similarly, SAL may be divided into SAL-A and SAL-B, where SAL-A is the portion of SAL minimally required for system initialization or recovery, including flash memory updating. The SAL-A may be further subdivided into a basic SAL-A that will not be updated in the future (SAL-A generic) and SAL-A that may need updating from time to time (SAL-A specific). In order to safeguard against corruption during updating, in one embodiment the PAL-A generic and SAL-A generic may be located in a protected portion of flash memory that may not be modified.

In order to increase system availability and reliability, the PAL-A specific and SAL-A specific may occur in multiple copies. Consider that a system may contain processors of two revision levels, which may be labeled for convenience type 1 and type 2 processors. In other embodiments there may be additional processors of further revision levels. In the FIG. 2 embodiment, there may be one copy of PAL-A generic 220, but two copies of PAL-A specific for a type 1 processor (primary PAL-A specific type 1 230 and secondary PAL-A specific type 1 240). Similarly there may be two copies of PAL-A specific for a type 2 processor (primary PAL-A specific type 2 232 and secondary PAL-A specific type 2 242). There may also be one copy of SAL-A generic 222 and two copies of SAL-A specific, primary SAL-A specific 246 and secondary SAL-A specific 260. In other embodiments there may be additional copies and additional types of firmware located within flash memory. In one embodiment, the copies may be exact copies, but in other embodiments the copies may be similarly functionally but not exact copies.

When a processor, for example one of type 1, begins execution following a resetting event, the processor begins execution at a pre-determined location, called the reset vector, within PAL-A generic 220. The processor executing PAL-A generic 220 may discover the location of other code modules using a primary firmware interface table (FIT) 224 or a secondary FIT 234. PAL-A generic 220 code knows the entry points of primary FIT 224 and secondary FIT 234 by the vectors located within the fixed locations primary FIT pointer 210 and secondary FIT pointer 212. PAL-A generic 220 executing on a processor may use these FIT pointers to locate the FIT, then subsequently use the FIT to locate and validate the other software modules. For example, the type 1 processor may use primary FIT pointer 210 to discover the location of primary FIT 224. Then the type 1 processor may use the location, size, checksum, and other parameters within primary FIT 224 to locate and examine primary PAL-A specific type 1 230. If the type 1 processor cannot locate or validate primary PAL-A specific type 1 230, then it may use secondary FIT pointer 212 and secondary FIT 234 to locate and examine secondary PAL-A specific type 1 240.

If the type 1 processor locates and validates either primary PAL-A specific type 1 230 or secondary PAL-A specific type 1 240, the type 1 processor may then try to locate and examine SAL-A. The PAL-A generic 220 locates the entry point of, and begins the execution of, either primary PAL-A specific type 1 230 or secondary PAL-A specific type 1 240. Then either primary PAL-A specific type 1 230 or secondary PAL-A specific type 1 240 locates the entry point of, and hands off control to, SAL-A generic 222, which in turn validates itself and either primary SAL-A specific 246 or secondary SAL-A specific 260. In one embodiment, the type 1 processor uses the primary FIT pointer 210 and primary FIT 224 to locate and examine primary SAL-A specific 246.

If the type 1 processor cannot locate and validate primary SAL-A specific 246, then the type 1 processor may use the secondary FIT pointer 212 and secondary FIT 234 to locate and examine secondary SAL-A specific 260.

After locating and validating those portions of PAL and SAL required for initialization or recovery, the SAL-A generic 222 executing on a processor may determine a processor health status relative to that processor. The computation of the health status may be performed by SAL-A generic 222 based upon the various firmware validity checks, including checksums, and also upon the handoff status code provided by the PAL-A specific during the handoff of control to SAL-A generic 222. The processor health status may also be ranked upon which combination of firmware components is determined to possess satisfactory health status. In one embodiment, the processor health status may be determined to be higher if a copy of primary PAL-A specific and primary SAL-A specific are found and validated. A somewhat lower processor health status may be determined if a copy of secondary PAL-A specific and secondary SAL-A specific are found and validated. Even lower processor health status may be determined if only a copy of primary PAL-A specific and secondary SAL-A specific, or secondary PAL-A specific and primary SAL-A specific, are found and validated. Finally a lowest or "fatal" processor health status may be determined if no copy of either PAL-A specific or SAL-A specific can be found and validated.

Figure 3:
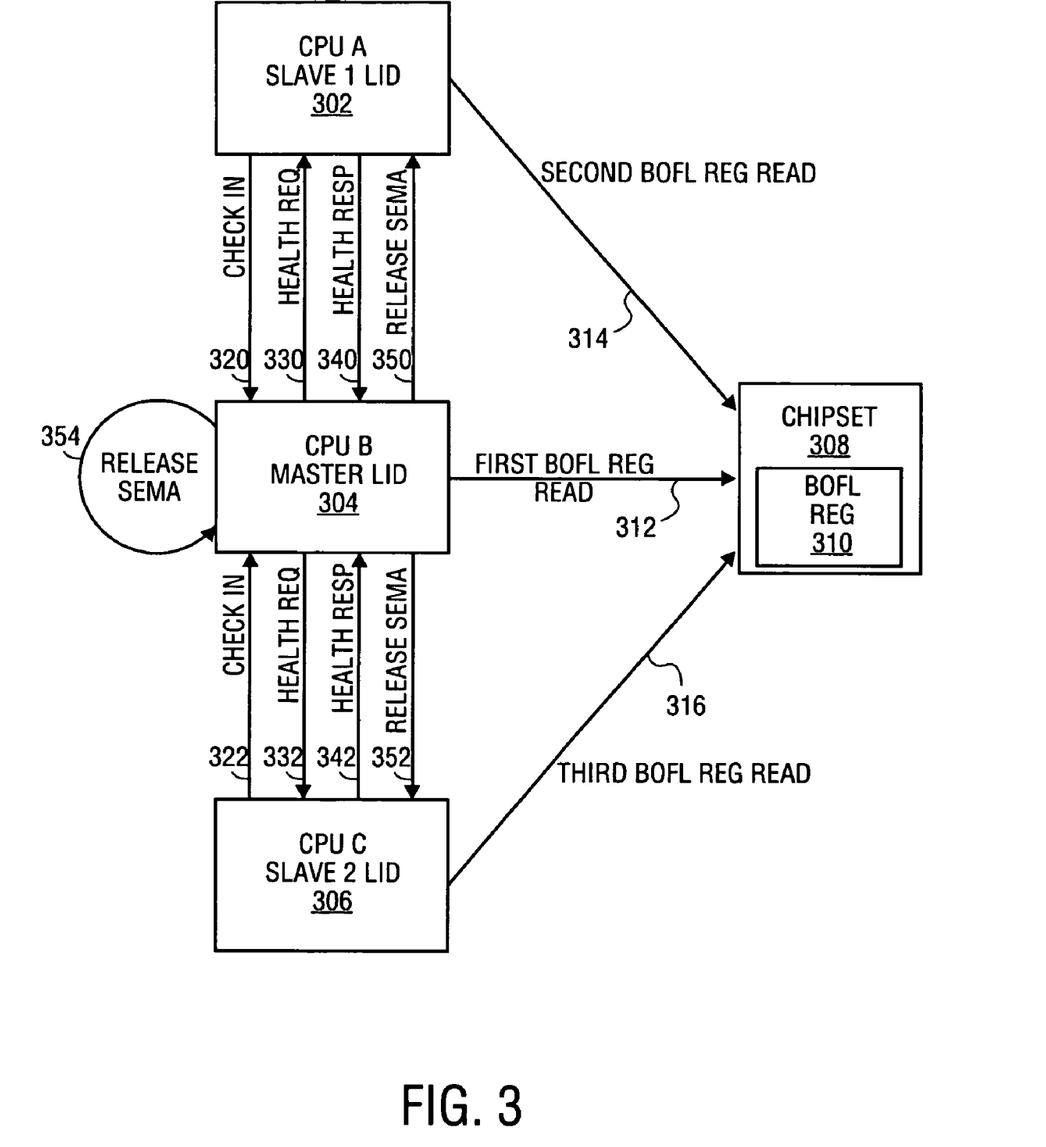
FIG. 3 is an inter-component messaging diagram, according to one embodiment of the present disclosure.

Referring now to FIG. 3, an inter-component messaging diagram is shown, according to one embodiment of the present disclosure. In one embodiment, the messages may each be carried in an inter-processor interrupt (IPI). After the resetting event that initiated the processors' self-tests, the processors may disable interrupts. When interrupts are disabled by a processor or when the processor is in "polled" interrupt mode, sending an IPI to that processor may still write a vector into that processor's IRR. In this case the vectors deposited within the processor's IRR may represent the message sender's LID, a relative health value, or other data. In other embodiments, other means of carrying the message may be used, such as a dedicated hardware inter-processor signal or by having special signals multiplexed upon a data bus. In the FIG. 3 embodiment, three processors, CPU A 302, CPU B 304, and CPU C 306 are shown, but in other embodiments more or fewer processor may participate in the process. After a resetting event, each of the three processors, CPU A 302, CPU B 304, and CPU C 306, perform self-tests. In one embodiment, the self-tests may include the determination of processor health status discussed above in connection with FIG. 2. Upon each processor determining its own processor health status, it may be desirable to permit only those processors with the best available processor health status to continue with booting operations. In other embodiments, performance requirements may make it desirable to permit the largest group with acceptable processor health status to continue with booting operations.

In the FIG. 3 example, all three processors determine a non-fatal processor health status. Each processor assumes at first that it is the master and assigns itself the master LID. This step is required to ensure that check-in vector communications will not be lost. Each then reads the BOFL register 310 of chipset 308 subsequent to this determination. The first processor to determine its processor health status, in this example CPU B 304, makes the first BOFL register read 312 from BOFL register 310 subsequent to the resetting event. Therefore CPU B 304 becomes the master and continues to use the master LID as an identifier for inter-processor communications. In this example, CPU A 302 is the second processor to determine its processor health status, and makes the second BOFL register read 314. Therefore CPU A 302 becomes a slave and uses a unique non-master LID (slave 1 LID) as an identifier for inter-processor communications. Finally, in this example, CPU C 306 is the third processor to determine its processor health status, and makes the third BOFL register read 316. Therefore CPU C 306 becomes a slave and uses a unique non-master LID (slave 2 LID) as an identifier for inter-processor communications.

When a processor determines that it is a slave, it computes a unique slave LID and proceeds to send a check in message, representing its own LID, to the processor using the pre-determined master LID. In one embodiment, unique slave LIDs may be computed by using the geographically unique identifiers passed from the PAL to the SAL. In one embodiment the PAL may determine these identifiers from values read from one or more pins on the physical processor package. In the FIG. 3 example, CPU A 302 and CPU C 306 send their check in messages 320, 322, respectively, to CPU B 304. In one embodiment CPU B 304 may respond immediately to the receipt of a check in message with a corresponding health request message to the processor that sent the check in message. In other embodiments, CPU B 304 may wait a pre-determined time to receive all check in messages before responding with the health request messages. For the FIG. 3 example, CPU B 304 sends health request messages 330, 332, to CPU A 302 and CPU C 306, respectively. Then CPU A 302 and CPU C 306 send a copy of their processor health status to CPU B 304 in the form of health response messages 340, 342, respectively. In other embodiments, the actual health status may be replaced with vectors that have a pre-defined relationship with specific health status values.

Once the processor with the master LID, in this example CPU B 304, receives the processor health status of all responding processors, it may determine the highest ranked processor health status available. The common processor health status of this group may be called a group health status. In other embodiments, where performance may be an issue, the group of processors determined may instead be the group with the largest number of processors that have an acceptable processor health status. In either embodiment, the processor with the master LID, in this example CPU B 304, then sends a release semaphore message to all of the slave processors and also to itself. The release semaphore may include a copy of the group health status. In other embodiments, the actual group health status may be replaced with a vector that has a pre-defined relationship with the group health status.

In the FIG. 3 example, CPU B 304 sends release semaphore 350 to CPU A 302, release semaphore 352 to CPU C 306, and release semaphore 354 to itself. Each processor then compares the group health status represented by the corresponding release semaphore to its own processor health status. If there is a match, then that processor continues with booting operations. If, however, there is no match, then that processor halts or otherwise becomes inactive, and does not continue with booting operations.

Figure 4:
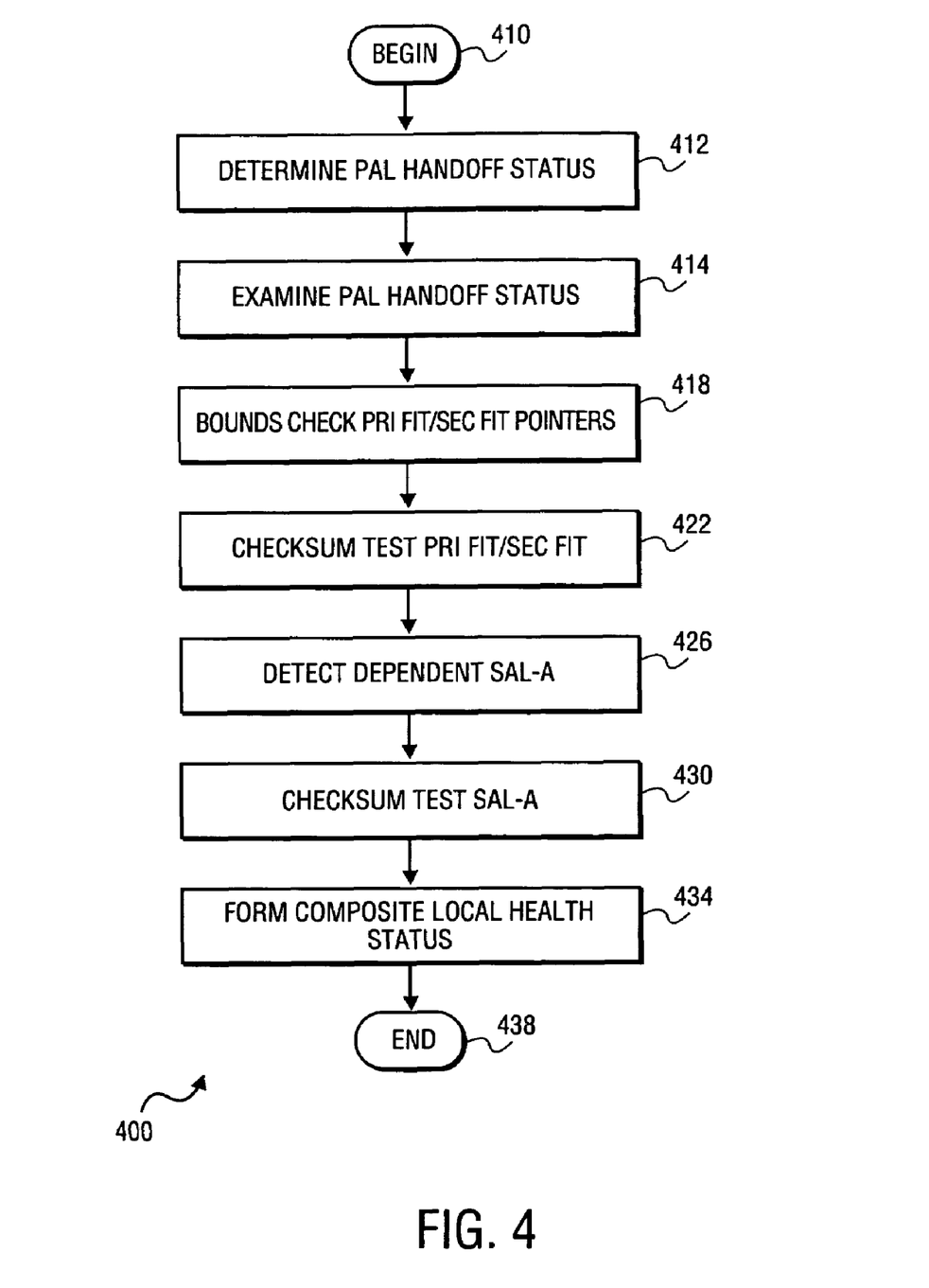
FIG. 4 is a flowchart showing the derivation of local processor health status, according to one embodiment of the present disclosure.

Referring now to FIG. 4, a flowchart shows the derivation of local processor health status, according to one embodiment of the present disclosure. In other embodiments, other tests of firmware, tests of hardware, or some combination thereof may be performed to yield another form of local processor health status. When the FIG. 4 process begins, at block 410, the PAL gains control immediately after the resetting event, and, at block 412, computes a PAL handoff status and stores it in a register for the SAL to use. Then the PAL hands off control to the SAL. The PAL may provide this handoff status upon entry into a recovery check, which may include determining whether the PAL is compatible with the current processor or whether the processor is fully functional. Then in block 414 the SAL examines the PAL handoff status previously stored. The PAL handoff status is utilized along with additional tests performed by the SAL to compute a composite local health. The PAL handoff status may convey information on multiple possible errors. In one embodiment, the possible errors may be correlated to a group of four status categories: normal operation utilizing primary copies of firmware; failover operation utilizing secondary copies of firmware; failure in non-redundant or non-critical firmware components; and fatal failure.

Then in block 418, a bounds check of the primary FIT pointer and secondary FIT pointer may be performed. This may be necessary to prevent accidental accesses to protected or reserved areas within the memory address space that could potentially result in system hangs. In block 422, a checksum test may be performed on the primary FIT and on the secondary FIT. The checksums returned by these tests may be used to prevent the execution of corrupted code or to prevent the searching of corrupted flash tables. Then in block 426, the primary FIT and secondary FIT may be examined to determine whether a corresponding primary SAL-A specific and secondary SAL-A specific, respectively, exist. This test may ensure the existence of proper firmware to support any necessary SAL-A tests. Then in block 430, a checksum test may be performed on the copies of SAL-A specific detected in block 426. The checksums returned by these tests may again be used to prevent the execution of corrupted code or to prevent the searching of corrupted flash tables.

In block 434 the results of preceding blocks may be used to form the composite local processor health status. In one embodiment, five levels of processor health status may be derived. In other embodiments, other levels of processor health status may be derived. A best processor health status may be determined if a valid primary PAL-A specific and valid primary SAL-A specific are found. A second best processor health status may be determined if only a valid secondary PAL-A and valid secondary SAL-A specific are found. A third best processor health status may be determined if only a valid primary PAL-A specific and a valid secondary SAL-A specific are found. A fourth best processor health status may be determined if only a valid secondary PAL-A specific and a valid primary SAL-A specific are found. Finally a worst processor health status may be determined if no valid combinations of PAL-A and SAL-A are found, and may also be determined with other serious error conditions.

Figure 5:
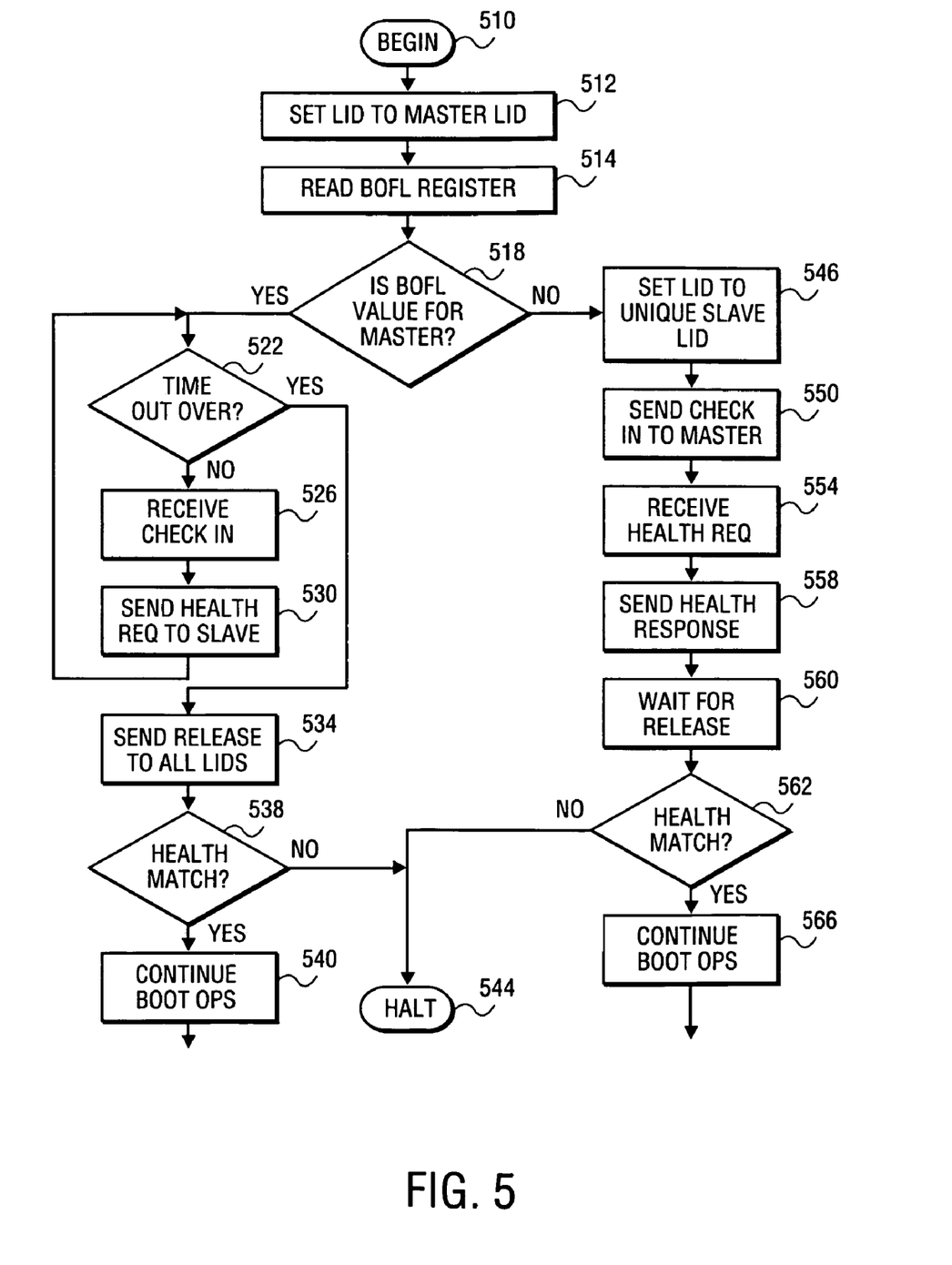
FIG. 5 is a flowchart showing the selection and initialization of healthy processors, according to one embodiment of the present disclosure.

Referring now to FIG. 5, a flowchart shows the selection and initialization of healthy processors, according to one embodiment of the present disclosure. Each processor within a system may perform the FIG. 5 process. The process begins upon a resetting event at block 510. Upon determining a local processor health status, the processor assigns itself the master LID value to ensure no subsequent check-in events are lost. The processor then reads the BOFL register, at block 514. Then in decision block 518, the processor determines if it has become the master processor based upon the value read from the BOFL. If so, then the process exits decision block 518 via the YES path, and the processor initiates a check in timeout period. In decision block 522, the processor determines whether the time out period is over. If not, then the process exits decision block 522 via the NO path, and the processor receives any check in messages present, if any, in block 526. The processor determines the LIDs corresponding to the sender of the check in messages. In block 530, the processor responds to any check in messages found in block 526 by sending a health request message to the corresponding slave processor. Then the processor returns to decision block 522. When the timeout period is over, the process exits decision block 522 via the YES path. In block 534, the processor determines the group health status and sends a message containing the group health status to all the LIDs identified from the check in messages received. The processor then, in decision block 538, determines whether the group health status matches its own processor health status. If so, then the process exits decision block 538 via the YES path, and the processor continues with booting operations in block 540. If not, however, then the process exits decision block 538 via the NO path, and the processor halts or otherwise becomes inactive in block 544.

If, however, in decision block 518 the processor determines that it is a slave processor, then the processor exits decision block 518 via the NO path. The processor then assigns itself a unique slave LID. The processor then sends, in block 550, a check in message, representing its LID value, to the processor with the master LID. The processor then waits for and receives the corresponding health request message in block 554. The processor then sends its own processor health status in a health response message, in block 558. The processor waits for and receives a release semaphore message, in block 560. The processor then, in decision block 562, determines whether the group health status matches its own processor health status. If so, then the process exits decision block 562 via the YES path, and the processor continues with booting operations in block 566. If not, however, then the process exits decision block 562 via the NO path, and the processor halts or otherwise becomes inactive in block 544.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system, comprising:
   a first processor to determine said first processor health status;
   a second processor coupled to said first processor to determine said second processor health status; and
   a hardware semaphore register coupled to said first processor and said second processor wherein either or both said first processor or said second processor are operable to attempt a boot process and both said first processor and said second processor share control of system booting operations when said first processor heath status is equal to said second processor health status.

2. The system of claim 1, wherein said first processor to determine a group health status utilizing said first processor health status and said second processor health status when said first processor reads from said hardware semaphore register before said second processor.

3. The system of claim 2, wherein said first processor to send a release message including said group health status to said second processor.

4. The system of claim 3, wherein said second processor to continue with boot operations if said group health status corresponds to said second processor health status.

5. The system of claim 3, wherein said first processor to read a first value from said hardware semaphore register, and said second processor to read a second value from said hardware semaphore register.

6. The system of claim 5, wherein said first processor includes a first processor interrupt request register and said second processor includes a second processor interrupt request register, wherein said second processor to send said second processor health status to said first processor interrupt request register.

7. The system of claim 6, wherein said first processor to send said group health status to said second processor interrupt request register.

8. A method, comprising:
    determining a first processor health status;
    determining a second processor health status;
    sending said second processor health status to said first processor;
    determining a group health status from said first processor health status and said second processor health status;
    enabling said first processor to continue with booting operations when said group health status corresponds to said first processor health status;
    enabling said second processor to continue with booting operations when said group health status corresponds to said second processor health status; and
    enabling both said first processor and said second processor to share control of booting operations when said first processor heath status is equal to said second processor health status.

9. The method of claim 8, wherein said enabling said second processor includes sending said group health status to said second processor.

10. The method of claim 9, wherein said sending said second processor health status is responsive to a health status request.

11. The method of claim 10, further comprising reading a hardware semaphore register by said first processor prior to reading said hardware semaphore register by said second processor.

12. The method of claim 11, wherein said reading a hardware semaphore register by said first processor includes receiving a first value.

13. A method comprising:
    determining a first processor health status;
    determining a second processor health status;
    sending said second processor health status to said first processor;
    reading a hardware semaphore register by said first processor prior to reading said hardware semaphore register by said second processor;
    determining a group health status from said first processor health status and said second processor health status; and
    enabling said second processor to continue with booting operations by sending said group health status to said second processor responsive to a health status request when said group health status corresponds to said second processor health status, wherein said determining said first processor health status includes utilizing a generic processor abstraction layer to examine a first firmware interface table and a second firmware interface table.

14. The method of claim 13, wherein said utilizing a generic processor abstraction layer includes examining a first copy of a first processor specific processor abstraction layer and a second copy of a first processor specific processor abstraction layer.

15. The method of claim 13, wherein said determining said first processor health status includes determining whether said first copy of a first processor specific processor abstraction layer has an associated first copy of a system abstraction layer, and also includes determining whether said second copy of a first processor specific processor abstraction layer has an associated second copy of a system abstraction layer.

16. The method of claim 8, wherein said sending said second processor health status to a first processor includes sending an inter-processor interrupt to said first processor.

17. The method of claim 16, wherein said sending an inter-processor interrupt to said first processor includes sending said second processor health status to a first processor interrupt request register when said first processor has interrupts disabled.

18. The method of claim 17, wherein said determining a group health status includes retrieving said second processor health status from said first processor interrupt request.

19. The method of claim 18, further comprising enabling said second processor to continue with booting operations by sending said second processor a second processor release message.

20. The method of claim 19, wherein said enabling said second processor includes enabling said second processor when said second processor release message includes a said group health status that matches said second processor health status.

21. An apparatus, comprising:
    means for determining a first processor health status;
    means for determining a second processor health status;
    means for sending said second processor health status to said first processor;
    means for determining a group health status from said first processor health status and said second processor health status;
    means for enabling said first processor to continue with booting operations when said group health status corresponds to said first processor health status;
    means for enabling said second processor to continue with booting operations when said group health status corresponds to said second processor health status; and
    means for enabling both said first processor and said second processor to share control of booting operations when said first processor health status is equal to said second processor health status.

22. The apparatus of claim 21, wherein said means for enabling said second processor includes means for sending said group health status to said second processor.

23. The apparatus of claim 22, wherein said means for sending said second processor health status is responsive to a health status request.

24. The apparatus of claim 23, further comprising means for reading a hardware semaphore register by said first processor prior to reading said hardware semaphore register by said second processor.

25. The apparatus of claim 24, wherein said means for reading a hardware semaphore register by said first processor includes means for receiving a first value.

26. An apparatus, comprising:
means for determining a first processor health status;
means for determining a second processor health status;
means for sending said second processor health status to said first processor;
means for reading a hardware semaphore register by said first processor prior to reading said hardware semaphore register by said second processor
means for determining a group health status from said first processor health status and said second processor health status; and
means for enabling said second processor to continue with booting operations by sending said group health status to said second processor responsive to a health request when said group health status corresponds to said second processor health status, wherein said means for determining said first processor health status includes means for utilizing a generic processor abstraction layer to examine a first firmware interface table and a second firmware interface table.

27. The method of claim 26, wherein said means for utilizing a generic processor abstraction layer includes means for examining a first copy of a first processor specific processor abstraction layer and a second copy of a first processor specific processor abstraction layer.

28. The apparatus of claim 27, wherein said means for determining said first processor health status includes means for determining whether said first copy of a first processor specific processor abstraction layer has an associated first copy of a system abstraction layer, and also includes means for determining whether said second copy of a first processor specific processor abstraction layer has an associated second copy of a system abstraction layer.

29. The apparatus of claim 28, wherein said means for sending said second processor health status to a first processor includes means for sending an inter-processor interrupt to said first processor.

30. The apparatus of claim 29, wherein said means for sending an inter-processor interrupt to said first processor includes means for sending said second processor health status to a first processor interrupt request register when said first processor has interrupts disabled.

31. The apparatus of claim 30, wherein said means for determining a group health status includes means for retrieving said second processor health status from said first processor interrupt request.

32. The apparatus of claim 31, further comprising means for enabling said second processor to continue with booting operations by sending said second processor a second processor release message.

33. The apparatus of claim 32, wherein said means for enabling said second processor includes means for enabling said second processor when said second processor release message includes a said group health status that matches said second processor health status.

34. A computer readable media, containing a program executable by a machine to perform the process comprising:
determining a first processor health status;
determining a second processor health status;
sending said second processor health status to said first processor;
determining a group health status from said first processor health status and said second processor health status; and
enabling said first processor to continue with booting operations when said group health status corresponds to said first processor health status;
enabling said second processor to continue with booting operations when said group health status corresponds to said second processor health status; and
enabling both said first processor and said second processor to continue share control of booting operations whenever said first processor health status is equal to said second processor health status.

35. The computer readable media of claim 34, wherein said enabling said second processor includes sending said group health status to said second processor.

36. The computer readable media of claim 35, wherein said sending said second processor health status is responsive to a health status request.

37. The computer readable media of claim 36, further comprising reading a hardware semaphore register by said first processor prior to reading said hardware semaphore register by said second processor.

38. The computer readable media of claim 37, wherein said reading a hardware semaphore register by said first processor includes receiving a first value.

39. A computer readable media, containing a program executable by a machine to perform the process comprising:
determining a first processor health status;
determining a second processor health status;
sending said second processor health status to said first processor;
reading a hardware semaphore register by said first processor prior to reading said hardware semaphore register by said second processor;
determining a group health status from said first processor health status and said second processor health status; and
enabling said second processor to continue with booting operations by sending said group health status to said second processor responsive to a health status request when said group health status corresponds to said second processor health status, wherein said determining said first processor health status includes utilizing a generic processor abstraction layer to examine a first firmware interface table and a second firmware interface table.

40. The computer readable media of claim 39, wherein said utilizing a generic processor abstraction layer includes examining a first copy of a first processor specific processor abstraction layer and a second copy of a first processor specific processor abstraction layer.

41. The computer readable media of claim 40, wherein said determining said first processor health status includes determining whether said first copy of a first processor specific processor abstraction layer has an associated first copy of a system abstraction layer, and also includes determining whether said second copy of a first processor specific processor abstraction layer has an associated second copy of a system abstraction layer.

42. The computer readable media of claim 34, wherein said sending said second processor health status to a first processor includes sending an inter-processor interrupt to said first processor.

43. The computer readable media of claim 42, wherein said sending an inter-processor interrupt to said first processor includes sending said second processor health status to a first processor interrupt request register when said first processor has interrupts disabled.

44. The computer readable media of claim 43, wherein said determining a group health status includes retrieving said second processor health status from said first processor interrupt request.

45. The computer readable media of claim 44, further comprising enabling said second processor to continue with booting operations by sending said second processor a second processor release message.

46. The computer readable media of claim 45, wherein said enabling said second processor includes enabling said second processor when said second processor release message includes a said group health status that matches said second processor health status.

* * * * *